May 22, 1956 A. A. VARELA 2,747,082

DECOUPLING SYSTEM

Original Filed July 27, 1942

Inventor

ARTHUR A. VARELA

By Ralph L. Chappell

Attorney

United States Patent Office 2,747,082

Patented May 22, 1956

2,747,082

DECOUPLING SYSTEM

Arthur A. Varela, Washington, D. C.

Application October 18, 1945, Serial No. 623,162

3 Claims. (Cl. 250—13)

Figures 1, 1A, 1B, 2, 3:
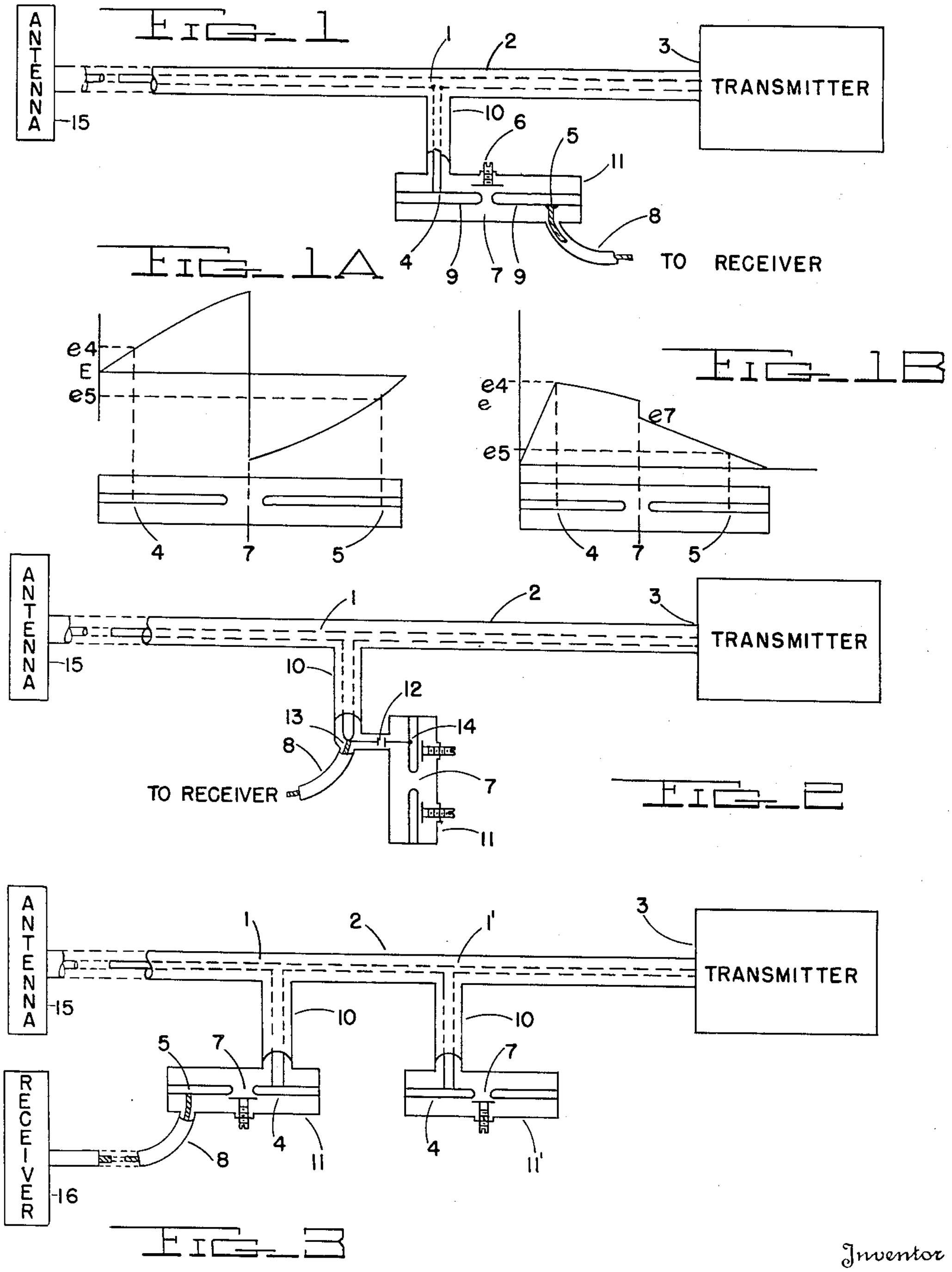

(Granted under Title 35, U. S. Code (1952), sec. 266)

This application is a division of application of A. A. Varela and R. A. Herring, Jr., Serial No. 452,534, filed July 27, 1942, Patent No. 2,611,079, granted September 16, 1952.

This invention relates broadly to an automatic coupling means for transceiver antenna systems and more particularly to a means facilitating the use of a single antenna in both the transmission and reception of radio echo waves.

In radio echo equipment for obstacle detection, wherein a short impulse is transmitted periodically and reflections of the impulse from obstacles are received at the same point, it is generally desirable to use the same antenna for both transmission and reception. This necessitates some means for automatically decoupling the receiver from the antenna during operation of the transmitter to prevent damage to the receiver tubes and useless absorption of power from the transmitter. Such means have been devised and are known to the art.

During the receiving period, the transmitter constitutes a load shunted across the transmission line. This load absorbs some of the received energy and reduces the power available for the receiver input.

It is accordingly an object of this invention to provide means for decoupling the transmitter from the transmission network feeding the received energy to the receiver.

It is another object of the invention to provide means whereby energy may be fed into a transmission line and thence into a branch line tapped thereinto at an intermediate point without the remaining portions of the transmission line and its associated apparatus absorbing any of the available energy.

All of the duplexing systems with which this invention is concerned employ a transmission line of an odd quarter wave length between the main antenna transmission line and the transforming or impedance switching tank. When the transmitter is operating this line resonates and presents a high impedance to the main junction. Decoupling of the receiver from this line is desirable in order to obtain the highest possible impedance at the junction and minimum power absorption by the receiver.

The devices with which this invention is concerned employ either a spark, a glow discharge tube or a biased diode as the primary switching element and depend on the change of this element from high resistance for low voltages for low resistance for high voltages. Thus it can be shown that the efficiency of the duplexing system increases as the circuit impedance across the discharge device in its non-conducting state increases.

The impedance across a spark gap or diode when inserted as part of the inner conductor of a selected length of resonant concentric line can be shown to be proportional to:

$$\frac{\left(\cos^2\frac{2\pi L_1}{\lambda}\right)\left(\cos^2\frac{2\pi L_2}{\lambda}\right)}{\left(1+\frac{\sin\frac{(4\pi L_1)}{\lambda}}{\frac{4\pi L_1}{\lambda}}\right)\left(\cos^2\frac{2\pi L_2}{\lambda}\right)+\left(1-\frac{\sin\frac{4\pi L_2}{\lambda}}{\frac{4\pi L_2}{\lambda}}\right)\left(\cos^2\frac{2\pi L_2}{\lambda}\right)}$$

Where $L_1$ is the length of the inner conductor on one side of the gap, $L_2$ is the length of the inner conductor on the other side of the gap and $\lambda$ is the wave length. Thus, maximum impedance will occur at the gap when $L_1$ is equal to $L_2$. When this condition is satisfied optimum efficiency of the switching means results.

Referring now to the drawings:

Fig. 1 is an elevational view partly in cross-section embodying the principles of this invention;

Fig. 1*a* is a graphical representation of the voltage distribution on the switching means when the receiver is coupled to the antenna;

Fig. 1*b* is a graphical representation of the voltage distribution on the switching means when the transmitter is coupled to the antenna, and Figs. 2 and 3 are elevational views partly in cross-section, showing alternate arrangements embodying this invention.

Referring to Fig. 1 in more detail, the output of transmitter 3 is coupled to a non-resonant line 2 which feeds an antenna, shown in block at 15. The inner and outer conductors of one end of a quarter wave matching line 10 are conductively secured to the corresponding conductors of the main transmission line 2 at some point 1 an odd number of quarter wave lengths from transmitter 3. The other end of the conductors of matching line 10 are conductively secured to the corresponding conductors of concentric tank 11, shown in section, at some point 4 along its axis. In physical description of the tank in this embodiment, tank 11 is a little longer than one quarter wave length and has each end shorted by a metal conductor. The inner conductor 9 is broken at its mid-point in order to form spark gap 7 and satisfy the aforementioned equation to produce maximum impedance change. Electrically, as will be seen from Fig. 1*a*, the distance between points 4 and 5 in tank 11 is approximately one-half wavelength at the operating frequency, being slightly less due to the capacitive effect of the spark gap 7. A concentric line 8 will be used to couple the receiver to some predetermined point 5 on the tank 11.

The location of point 4 is selected as a function of the amount of power dissipated by gap 7 and point 5 is selected so as to establish a one-to-one coupling between lines 10 and 8 during the quiescent periods of gap 7.

On a received signal the impedance facing one another throughout the arrangement are matched and cause the tank to perform like a tuned transformer. The impedance of the tank rises gradually from a minimum at one end to a maximum at the gap 7 and then falls to a minimum at the other end. Gap 7 will function as a resonating capacitor between the two sections of the tank and assist in the production of a one-to-one coupling between points 4 and 5 as illustrated by the graph of Fig. 1*a*.

Upon the operation of transmitter 3 gap 7 fires and forfeits its high impedance. The input impedance at point 4 will then diminish to some value R-JX. Subsequently the impedance at point 1 will increase by an amount sufficient to satisfy a characteristic impedance equation of a quarter matching section such as line 10. This increase of impedance at point 1 prevents a large amount of power from flowing in to tank 11 from line 2. The voltage on the tank, in this case, will appear similar to that shown by Fig. 1*b*. It is therefore obvious that the coupling between points 4 and 5 has decreased considerably.

Fig. 2 shows an alternate method of decoupling the receiver from the antenna. Quarter wave line 10 joins the receiver line 8 and concentric tank 11 to the transmission line 2 at point 1. Upon the firing of the gap 7, series capacitor 12 resonates with the tank and lead reactance. The voltage at 13 will then fall to some lower value than that at 14 resulting in a small ratio of coupling between the receiver and antenna. Whether there are any advantages of this arrangement over that shown in Fig. 1 depends mainly on the frequency, power and spark gap capacitance.

Another alternate arrangement is shown by Fig. 3. An auxiliary tank 11' is used to decouple the transmitter to prevent absorption of power during operation of the receiver. Lines 10 and 10' join their respective impedance tanks to transmission line 2 at points 1 and 1' displaced one from another by one-quarter wave length. The operation of tank 11' is similar to 11 in that it will offer a high impedance to the passage of low radio frequency voltages at point 1' when the gap 7 is conducting, and a low impedance when the gap is not conducting. Thus, tank 11, through its coupling line 10 tapped on to the transmission line 2 at 1', causes the transmission network to the right of point of 1 of line 2 to offer a high impedance looking toward the point 1'. In this way, the energy received on antenna 15 is delivered to line 8 for receiver 16 without loss of power.

Although I have shown and described certain and specific embodiments of this invention I am fully aware of the many modifications possible thereof. This invention is not to be restricted except insofar as is necessitated by prior art and by the spirit of the appended claims.

The invention described herein may be manufactured and used by or for the Government of the United States of America for governmental purposes without the payment of any royalty thereon or therefor.

What is claimed is:

1. A terminal for a two-way signal transmission medium comprising an alternating signal wave generator, a signal receiver, common transmission means for transmitting the signal waves produced by said generator to said medium and for receiving alternating signal waves from said medium, a transmission line connecting said wave generator to said common transmission means, a second branch transmission line including a cavity resonator tuned to the frequency of the signal waves produced by said generator and to the frequency of the signal waves received by said common transmission means from said medium, having its input directly coupled to the first transmission line and its output connected to said receiver, a spark gap across said cavity resonator adapted to discharge to produce an effective short circuit thereacross, and thus to reduce the voltage input to the receiver, in response to the resonant voltage applied to the input of said resonator by the outgoing waves transmitted from said generator over said first line, and to be maintained in the undischarged condition in response to the relatively lower resonant voltage applied to the input of said resonator by the incoming signal waves received over said first line from said common transmission means, so as to allow transmission of said incoming waves over said second line to said receiver with little loss.

2. A terminal for a two-way signal transmission medium comprising an alternating signal wave generator, a signal receiver, common transmission means for transmitting the signal waves produced by said generator to said medium and for receiving alternating signal waves from said medium, a first branch transmission line connecting said wave generator to said common transmission means, a second branch transmission line including a cavity resonator tuned to the frequency of the signal waves produced by said generator and to the frequency of the signal waves received by said common transmission means from said medium, said second branch transmission line having its input directly coupled to the first branch transmission line and its output connected to said receiver, said cavity resonator interposed said second branch transmission line at a distance approximately $n\lambda/4$, where $n$ is an odd integer, from said second branch transmission line, said cavity resonator having input and output connections, a spark gap disposed within said cavity resonator at a point equidistant the input and output connections thereof, said spark gap being adapted to discharge to produce an effective short circuit thereacross in response to the resonant voltage applied to the input of said resonator by the outgoing waves transmitted from said generator over said first line, and to be maintained in the undischarged condition in response to the relatively lower resonant voltage applied to the input of said resonator by the incoming signal waves received over said first branch transmission line from said common transmission means, so as to allow transmission of said incoming waves over said branch transmission line to said receiver with little loss.

3. A terminal for a two-way signal transmission medium comprising an alternating signal wave generator, a signal receiver, common transmission means for transmitting the signal waves produced by said generator to said medium and for receiving alternating signal waves from said medium, a first branch transmission line connecting said wave generator to said common transmission means, a second branch transmission line including a cavity resonator tuned to the frequency of the signal waves produced by said generator and to the frequency of the signal waves received by said common transmission means from said medium, said second branch transmission line having its input directly coupled to the first branch transmission line and its output connected to said receiver, said cavity resonator interposed said second branch transmission line at a distance approximately $n\lambda/4$, where $n$ is an odd integer, from said input of said second branch transmission line, said cavity resonator having an input connection for injecting a signal therein, a spark gap disposed within said cavity resonator at a point approximately $n\lambda/4$, where $n$ is an odd integer, from the input connection thereof, said spark gap being adapted to discharge to produce an effective short circuit thereacross in response to the resonant voltage applied to the input of said resonator by the outgoing waves transmitted from said generator over said first branch transmission line, and to be maintained in the undischarged condition in response to the relatively lower resonant voltage applied to the input of said resonator by the incoming signal waves received over said first branch transmission line from said common transmission means, so as to allow transmission of said incoming waves over said second branch transmission line to said receiver with little loss.

References Cited in the file of this patent

UNITED STATES PATENTS

| | | |
|---|---|---|
| 1,035,958 | Girardeau | Aug. 20, 1912 |
| 2,189,549 | Hershberger | Feb. 6, 1940 |
| 2,410,641 | Evans | Nov. 5, 1946 |
| 2,412,161 | Patterson | Dec. 3, 1946 |
| 2,688,746 | Young | Sept. 7, 1954 |